(No Model.)
J. WEEKS.
SPRING HANGING DEVICE.
No. 414,097. Patented Oct. 29, 1889.
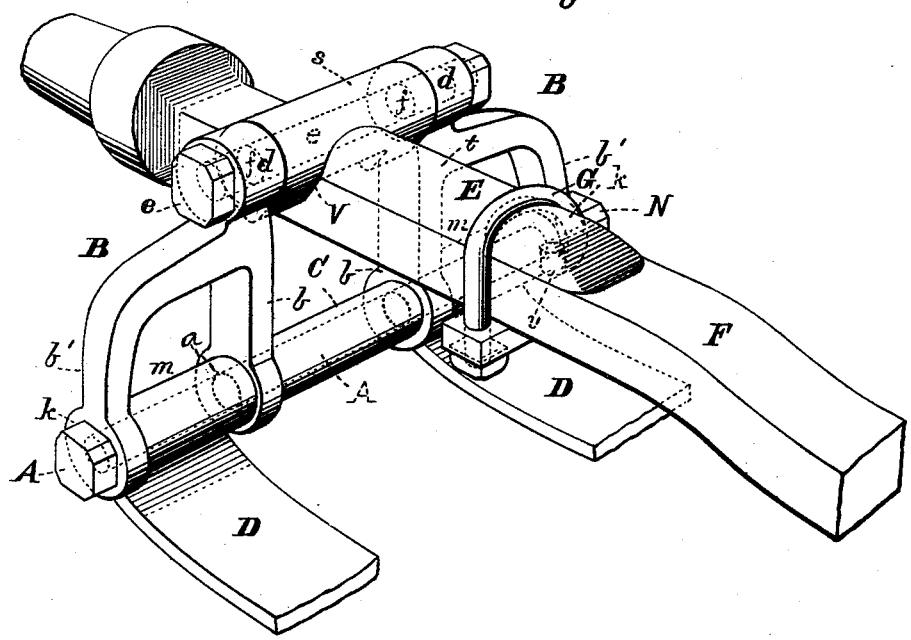
WITNESSES
Villette Anderson
J.W. Anderson
INVENTOR
James Weeks
by C.W. Anderson
Attorney

UNITED STATES PATENT OFFICE.

JAMES WEEKS, OF SPRINGFIELD CENTRE, NEW YORK.

SPRING-HANGING DEVICE.

SPECIFICATION forming part of Letters Patent No. 414,097, dated October 29, 1889.

Application filed June 29, 1889. Serial No. 316,039. (No model.)

*To all whom it may concern:*

Be it known that I, JAMES WEEKS, a citizen of the United States, and a resident of Springfield Centre, in the county of Otsego and State of New York, have invented certain new and useful Improvements in Spring-Hangings; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention and is a perspective view. Fig. 2 is a vertical section through the T-shaped iron with its fastening-bolt and through the lower bolt with its sleeve.

This invention relates to hangers for vehicle-springs; and it consists in the novel construction and combination of parts, as hereinafter described, and pointed out in the appended claim.

In the accompanying drawings, the letter A designates a horizontal bolt engaging at each end angular bifurcated pendent bearings B through perforations $a$ in the arms $b$ $b'$ thereof. The center portion of the bolt A is provided with a bracing-sleeve C between the vertical arms $b$ of the end bearings B, said sleeve being designed to hold the bearings at the proper distance apart. The end portions of the bolt A form the seats $m$ $m$ for the eyes of the springs D D. Each end bearing B consists of the angular outer arm $b'$ and the vertical arm $b$, having an upper extension $d$, perforated at $f$ to receive the bolt $e$, which passes through and secures the bearings to the T-shaped iron E. The angular outer arm $b'$ projects laterally from each arm $b$ below the perforated portion $f$, and is curved downward, terminating in a perforated end $k$, which receives the end of the bolt A. The bolt A serves to hold the end bearings in position and to provide the seats for the spring. It is secured by means of a nut N.

The T-shaped attachment-iron E consists of a perforated head or sleeve $s$, and a tongue or bar portion $t$, and it is secured between the upper ends of the bearings B B by means of a bolt $e$, which passes through the upper perforations of the said bearings and the sleeve. A spur $v$ is provided on the under side of the bar portion $t$ to engage a corresponding socket in the axle F, and the bottom of the sleeve is recessed or notched at V to receive the upper portion of the axle, and the T-shaped iron is secured to the latter by a clip G, passing over the bar portion, as shown.

The spring-hangers are clipped to the axle at each end, and the eyes of the springs D engage the seats at the ends of the bolt A, between the vertical arms $b$ $b'$ of the end bearings, as aforesaid.

Having described this invention, what I claim, and desire to secure by Letters Patent, is—

The duplex spring-hanger consisting of the notched T-shaped attachment, its cross portion being hollow or tubular, the end bifurcated pendent bearings, each bearing comprising two arms or pendants, one extending laterally from the other and downwardly, and the upper end of each pendent bearing having a single eye, and the lower end of each bearing having two eyes, and the bolts, one passing through the upper eyes of the said bearings and the tubular portion of said T-shaped attachment, and the other bolt passing through the lower eyes of said bearings and the sleeve or tube interposed between the inner arms of said bearings, substantially as set forth.

In testimony whereof I affix my signature in presence of two witnesses.

JAMES WEEKS.

Witnesses:
  FRED W. SMITH,
  WALTER A. ACKERMAN.